United States Patent
Phillips

[15] 3,694,435
[45] Sept. 26, 1972

[54] 4,4,8,8-TETRACHLORO-2,6-DIORGANO-15-DITHIA-2,6-DIAZACYCLO-OCTANE-3,7-DIONES AND THEIR MANUFACTURE

[72] Inventor: Wendell Gary Phillips, Olivette, Mo.

[73] Assignee: Monsanto Company, St. Louis, Mo.

[22] Filed: Oct. 26, 1971

[21] Appl. No.: 192,646

[52] U.S. Cl.....................260/239.3 R, 71/90, 71/92, 260/543 H, 260/561 S, 260/562 S, 424/244
[51] Int. Cl. ..............................................C07d 93/36
[58] Field of Search...............................260/239.3 R

[56] References Cited
FOREIGN PATENTS OR APPLICATIONS
1,195,317   6/1965   Germany............260/239.3 R Primary Examiner—Henry R. Jiles
Assistant Examiner—Robert T. Bond
Attorney—Neal E. Wilis et al.

[57] ABSTRACT

4,4,8,8-Tetrachloro-2,6-diorgano-1,5-dithia-2,6-diazacyclooctane-3,7-diones are prepared from dichloromethane sulfenyl chlorides by elimination of HCl in the presence of an HCl scavenger. These compounds are pesticidally active and particularly useful as selective herbicides.

17 Claims, No Drawings

4,4,8,8-TETRACHLORO-2,6-DIORGANO-1,5-DITHIA-2,6-DIAZACYCLO-OCTANE-3,7-DIONES AND THEIR MANUFACTURE

This invention relates to 4,4,8,8-tetrachloro-2,6-diorgano-1,5-dithia-2,6-diazacyclooctane-3,7-diones of the formula

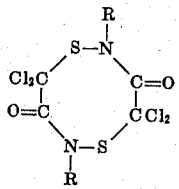

and their manufacture from the corresponding dichloromethane sulfenyl chlorides of the formula

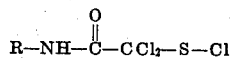

wherein R is alkyl of from one to six carbons, alkoxyalkyl of from two to eight carbons, benzyl, phenyl, substituted phenyl wherein the ring substituents thereof total from one to three same or different substituents selected from the group of substituents consisting of alkyl of from one to six carbons, lower alkoxy, halo, nitro, cyano and trihalomethyl, provided that the number of nitro substituents be from zero to two, and provided that the number of said substituents in the 2 and 6 positions on the ring be from zero to one, substituted benzyl wherein the substituents are in any position on the phenyl ring but otherwise as defined for substituted phenyl.

Examples of alkyl having from one to six carbons include methyl, ethyl, propyl, butyl, pentyl, hexyl and the various isomeric forms thereof including cyclopentyl and cyclohexyl.

Lower alkoxy have from one to five carbons. Examples of alkoxy include methoxy, ethoxy, propoxy, butoxy, pentoxy and the various isomeric forms thereof.

Examples of alkoxyalkyl of from two to eight carbons include but are not limited to, propoxymethyl, butoxybutyl, butoxyethyl, methoxymethyl, and ethoxypropyl.

Halo is a halogen selected from the group consisting of fluorine, chlorine, bromine and iodine.

Examples of substituted phenyl include, but are not limited to, phenyl groups of the formula

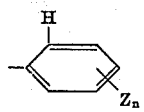

wherein Z is halo, trihalomethyl, cyano, nitro, alkyl of from one through six carbons or lower alkoxy, and $n$ is an integer from 1 to 3, provided that the number of nitro substituents be from 0 to 2.

The compounds of this invention are conveniently and efficiently prepared by elimination of hydrogen chloride from a dichloromethane sulfenyl chloride of the formula

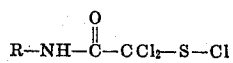

wherein R has the aforementioned significance, in the presence of an HCl scavenger. The reaction is postulated to proceed as follows:

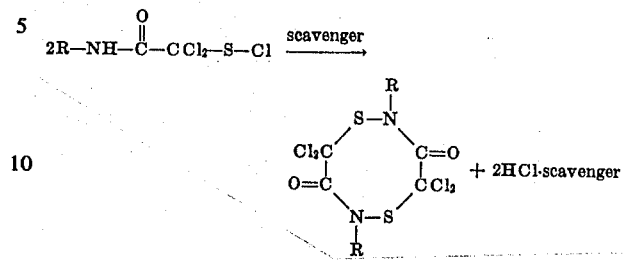

The HCl scavenger must be present in at least an equimolecular amount as compared to the substituted sulfenyl chloride. Generally not more than twice the equimolecular amount of scavenger is useful although the maximum amount is not critical. The type of scavenger is not critical to the invention so long as it does not interfere with the cyclization of the substituted sulfenyl chloride. Preferred scavengers are trialkyl amines. More preferred trialkylamines have from two through five carbons in the alkyl groups.

The reaction mass may consist only of the aforedescribed reactants and their reaction products or it may contain other components in addition such as diluents, other inert materials and solvents, i.e., common organic liquids which are inert under the reaction conditions and which may dissolve one or more of the reactants or products of the reaction, which solvents are exemplified by, but not limited to, aliphatic hydrocarbons, such as pentane, hexane, mineral spirits, etc., aromatics such as benzene, toluene, xylenes, etc., ethers such as diethyl ether, diisopropyl ether, petroleum ether, etc., esters such as methyl acetate, ethyl acetate, propyl acetate, etc., and other organics such as tetrahydrofuran, etc. The hydrochloride salt by-product is generally not soluble in the above solvents. Accordingly, the insoluble salt usually forms a precipitate in the reaction mass and may be easily removed by filtration. When filtration is not desired or the salt is soluble in the solvent, the salt may be readily removed from the reaction mass by extraction with water.

The reaction is normally carried out at a temperature above the freezing point of the system but preferably not above the boiling point of the system. More preferably, the reaction is carried out at temperatures of from about 0° C. to about 60° C. The reaction is most conveniently carried out at room temperature, about 23° C., in the presence of an organic solvent. The reaction is usually carried out at atmospheric pressure, but higher or lower pressures may be utilized if equipment and other factors favor such higher or lower pressures. The reaction may be carried out in an open vessel or under reflux.

The compounds of this invention are useful as biocides. Exemplary of such biocidal uses for these products is the control of nematodes, arachnids, arthropods and insects as well as eradication of noxious weeds. These compounds are particularly useful as pre-emergent and contact herbicides.

Pre-emergent and contact herbicidal compounds are useful in the selective killing of weeds in crops. In using the compounds of the present invention as pre-emergent and contact herbicides, the compounds can be used alone or in combination with a material referred to in the art as an adjuvant in liquid or solid form. Herbicidal formulations are prepared by admixing the compound which is the active ingredient of the formulation with an adjuvant including diluents, extenders, carriers and conditioning agents to provide compositions in the form of finely divided particulate solids, granules, pellets, solutions, dispersions or emulsions. Thus, the active ingredient can be used with an adjuvant such as a finely divided particulate solid, a liquid of organic origin, water, a wetting agent, dispersing agent, an emulsifying agent or any suitable combination of these. The herbicidal formulations usually contain from about 0.01 percent to about 99 percent by weight of the active ingredient. Application of these formulations to the soil or growth media can be carried out by simply admixing with the soil, by applying to the surface of the soil and thereafter dragging or discing into the soil to the desired depth, or by employing a liquid carrier to accomplish the penetration and impregnation. The application of liquid and particulate solid herbicidal formulations to the surface of soil or to above ground portions of plants can be carried out by conventional methods, e.g. power dusters, boom and hand sprayers and spray dusters. The formulations can also be applied from airplanes as a dust or a spray because of their effectiveness at low dosages. In a further method, the distribution of the active ingredients in soil can be carried out by admixture with the water employed to irrigate the soil. In such procedures, the amount of water can be varied with the porosity and water holding capacity of the soil to obtain the desired depth of distribution of the active ingredients.

The exact amount of active ingredient to be employed is dependent upon the response desired in the plat as well as such other factors as the plant species and stage of development thereof, the specific soil and depth at which the active ingredients are distributed in the soil and the amount of rainfall, as well as the specific active ingredient employed. In foliar treatment, the active ingredients are applied in amounts from about 1 to about 50 or more pounds per acre. In applications to soil for the control of the growth of germinant seeds, germinative seeds, emerging seedlings and established vegetation, the active ingredients are applied in amounts from about 0.1 to about 25 or more pounds per acre. It is believed that one skilled in the art can readily determine from the teachings of this specification the general procedure for any application.

Manufacture of dichloromethane sulfenyl chlorides, used as starting materials in the preparation of the compounds of the present invention, is taught in my prior U.S. Pat. application Ser. No. 139,976 filed May 3, 1971, entitled "Substituted Alpha, Alpha-Dichloro-Methane Sulfenyl Chlorides and Their Manufacture."

As illustrative of this invention, but not limitative thereof, is the following:

EXAMPLE 1

To a suitable reaction vessel equipped with an agitator is charged approximately 700 milliliters (ml.) of diethyl ether. Approximately 25 grams (g.), about 0.07 moles, of 2,2-dichloro-2-(chlorothio)-para-bromoacetanilide is added to and dissolved in the ether. Approximately 7.0 g., about 0.07 moles, of triethyl amine is dissolved in about 100 ml. of diethyl ether and this solution is then charged dropwise over a period of from 1 to 2 hours to the stirred acetanilide solution. A precipitate which forms is removed from the liquid portion of the reaction mass by filtration. The diethyl ether is removed from the liquid portion by vacuum distillation leaving a semi-solid residue. The residue is washed with about 50 ml. of diethyl ether. The solid which remains after the ether wash is separated from the ether by filtration. The filtered solid is allowed to dry in air and then is dissolved in and recrystallized from about 200 ml. of diethyl ether. The white solid is found to have a melting point of about 208° to 210° C., and is identified by infrared analysis as 4,4,8,8-tetrachloro-2,6-di-(parabromophenyl)-1,5-dithia-2,6-diazacyclooctane-3,7-dione

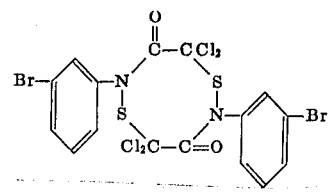

Calculated for $C_{16}H_8Br_2Cl_4N_2O_2S_2$: C, 30,70; H, 1.29; N, 4.48

Found: C, 30.81; H, 1.28; N, 4.29

EXAMPLE 2

To a suitable reaction vessel equipped with an agitator is charged approximately 500 ml. of diethyl ether. Approximately 38.8 g., about 0.1 moles of 2,2-dichloro-2-(chlorothio)-meta-(trifluoromethyl)acetanilide is added to and dissolved in the diethyl ether. Approximately 10.1 g., about 0.1 mole, of triethyl amine is then added. After the mass is stirred for about one-half hour at ambient room temperature, about 23° C, a precipitate appears. The precipitate is removed from the liquid by filtration. The diethyl ether is removed from the remaining liquid portion of the reaction mass by vacuum distillation. An oil remains which partially crystallizes upon scratching the interior of the vessel below the surface of the oil. Upon addition of about 100 ml. of cold diethyl ether a suspension forms. The suspended particles are removed by filtration, then dissolved in and recrystallized from diethyl ether. The while solid is found to be soluble in acetone, to be insoluble in water, and to have a melting point of about 164° to 167° C. and is identified by mass spectrometer and nuclear magnetic resonance analysis as 4,4,8,8-tetrachloro-2,6-di-[meta-(trifluoromethyl)phenyl]-1,5-dithia-2,6-diazacyclooctane-3,7-dione

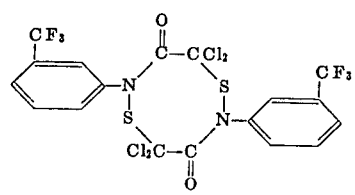

Calculated for $C_{18}H_8Cl_4F_6N_2O_2S_2$: C, 35.78; H, 1.33; N, 4.64

Found: C, 35.79; H, 1.52; N, 4.67

EXAMPLE 3

To a suitable reaction vessel equipped with an agitator is charged approximately 800 ml. of diethyl ether. Approximately 6.1 g., about 0.02 moles, of 2,2-dichloro-2-(chlorothio)-parachloroacetanilide is added to and dissolved in the ether. Approximately 2.0 g., about 0.02 moles, of triethylamine is then added. The reaction mass is stirred for about 30 minutes. The precipitate which forms in the reaction mass is separated from the liquid portion of the reaction mass by filtration. The ether is removed from the liquid portion by vacuum distillation leaving a residual oil. The oil crystallizes upon the addition of about 10 ml. of cold diethyl ether. The yellow solid is separated from the liquid portion by filtration, and is found to have a melting point of about 176° to 179° C., to be soluble in acetone and to be insoluble in water and is identified by nuclear magnetic resonance and infra-red analysis as 4,4,8,8-tetrachloro-2,6-di-(para-chlorophenyl)-1,5-dithia-2,6-diaza-cyclooctane-3,7-dione

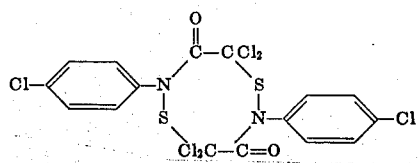

Calculated for $C_{16}H_8Cl_6N_2O_2S_2$: C, 35.78; H, 1.50; N, 5.22
Found: C, 35.98; H, 1.50; N, 5.10

EXAMPLE 4

To a suitable reaction vessel equipped with an agitator is charged approximately 700 milliliters (ml.) of diethyl ether. Approximately 34.9 grams (g.), about 0.07 moles, of 2,2-dichloro-2-(chlorothio)-meta-bromoacetanilide is added to and dissolved in the ether. Approximately 9.9 g., about 0.07 moles, of triethyl amine is dissolved in about 100 ml. of diethyl ether and this solution is then charged dropwise over a period of from 1 to 2 hours to the stirred acetanilide solution. A precipitate which forms is removed from the liquid portion of the reaction mass by filtration. The diethyl ether is removed from the liquid portion by vacuum distillation leaving an oily residue. To the oily residue is added about 50 ml. of diethyl ether. Upon scratching the interior of the vessel below the liquid level, crystals form which are separated from the liquid portion by filtration. The filtered solid is allowed to dry in air and then is dissolved in and recrystallized from diethyl ether. The white solid is found to have a melting point of about 190° to 194° C., to be soluble in acetone, diethyl ether, chloroform, ethanol, ethyl acetate, and dimethylformamide, and to be insoluble in water, and is identified by infrared analysis as 4,4,8,8-tetrachloro-2,6-di-(meta-bromophenyl)-1,5-dithia-2,6-diaza-cyclooctane-3,7-dione.

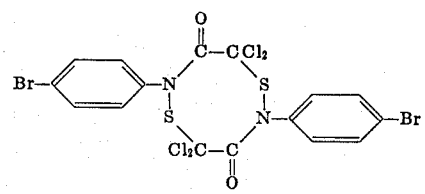

Calculated for $C_{16}H_8Br_2Cl_4N_2O_2S_2$: C, 30.70; H, 1.29; N, 4.48
Found: C, 30.86; H, 1.18; N, 4.52

EXAMPLE 5

To a suitable reaction vessel equipped with an agitator is charged approximately 200 ml. of diethyl ether. Approximately 15.3 g., about 0.05 moles, of 2,2-dichloro-2-(chlorothio)-paraacetotoluidide is added to and dissolved in the ether. Approximately 5.45 g., about 0.05 moles, of triethyl amine is then added. The reaction mass is stirred for about 2 hours. The precipitate which forms in the reaction mass is separated from the liquid portion of the reaction mass by filtration. The ether is removed from the reaction mass by vacuum distillation leaving a solid residue. The residue is dissolved in and recrystallized from diethyl ether. The white crystalline solid is found to have a melting point of about 216° to 218° C., to be soluble in acetone and diethyl ether, and to be insoluble in water and is identified by nuclear magnetic resonance and infrared analysis as 4,4,8,8-tetrachloro-2,6-di-para-tolyl-1,5-dithia-2,6-diazacyclooctane-3,7-dione

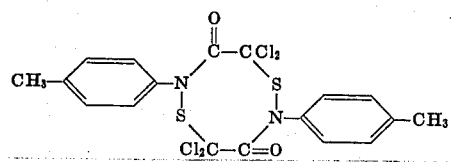

Calculated for $C_{18}H_{14}Cl_4N_2O_2S_2$: C, 43.56; H, 2.84; N, 5.65
Found: C, 43.50; H, 2.90; N, 5.49

EXAMPLE 6

The procedure of Example 1 is followed except that, instead of moving the first precipitate which forms after completion of the triethyl amine addition by filtration, about 200 ml. of water are added to the mass and the mass is stirred until the precipitate is no longer visible. The mass then separates into an organic and an aqueous phase, the aqueous phase, which contains the dissolved precipitate, is removed and the organic phase is then processed in the same manner as the remaining liquid portion in Example 1. The product of Example 1 is obtained.

EXAMPLES 7 and 8

The procedure of Example 1 is followed except that in place of 7.0 g. of triethyl amine, an equimolecular amount of the specified trialkyl amine is dissolved in diethyl ether and added dropwise to the reaction mass. The product of Example 1 is obtained.

Example 7 — Tripropyl amine.
Example 8 — Tributyl amine.

EXAMPLES 9 THROUGH 34

The procedure of Example 4 is followed except that, in place of about 34.9 g. of 2,2-dichloro-2-(chlorothio)-metabromoacetanilide, an approximately equimolecular amount of compound A is charged and product B is obtained:

EXAMPLE 9
A. 2,2-dichloro-2-(chlorothio)-N-methyl acetamide
B. 4,4,8,8-tetrachloro-2,6-dimethyl-1,5-dithia-2,6-diazacyclooctane-3,7-dione

EXAMPLE 10
A. 2,2-dichloro-2-(chlorothio)-N-cyclohexyl acetamide
B. 4,4,8,8-tetrachloro-2,6-dicyclohexyl-1,5-dithia-2,6-diazacyclooctane-3,7-dione

EXAMPLE 11
A. 2,2-dichloro-2-(chlorothio)-N-isopropyl acetamide
B. 4,4,8,8-tetrachloro-2,6-diisopropyl-1,5-dithia-2,6-diazacyclooctane-3,7-dione

EXAMPLE 12
A. N-tert.-butyl-2,2-dichloro-2-(chlorothio) acetamide
B. 4,4,8,8-tetrachloro-2,6-ditert.-butyl-1,5-dithia-2,6-diazacyclooctane-3,7-dione

EXAMPLE 13
A. 2,2-dichloro-2-(chlorothio)-N-isopentyl acetamide
B. 4,4,8,8-tetrachloro-2,6-diisopentyl-1,5-dithia-2,6-diazacyclooctane-3,7-dione

EXAMPLE 14
A. N-benzyl-2,2-dichloro-2-(chlorothio) acetamide
B. 4,4,8,8-tetrachloro-2,6-dibenzyl-1,5-dithia-2,6-diazacyclooctane-3,7-dione

EXAMPLE 15
A. 2,2-dichloro-N-(3,4-dichlorobenzyl)-2-(chlorothio) acetamide
B. 4,4,8,8-tetrachloro-2,6-di(3,4-dichlorobenzyl)-1,5-dithia-2,6-diazacyclooctane-3,7-dione

EXAMPLE 16
A. 2,2-dichloro-2-(chlorothio)-N-(2,6-dimethoxybenzyl)acetamide
B. 4,4,8,8-tetrachloro-2,6-di(2,6-dimethoxybenzyl)-1,5-dithia-2,6-diazacyclooctane-3,7-dione

EXAMPLE 17
A. 2,2-dichloro-2-(chlorothio)-N-(3,4,5-trifluorobenzyl) acetamide
B. 4,4,8,8-tetrachloro-2,6-di(3,4,5-trifluorobenzyl)-1,5-dithia-2,6-diazacyclooctane-3,7-dione

EXAMPLE 18
A. 2,2-dichloro-2-(chlorothio)-N-(para-nitrobenzyl) acetamide
B. 4,4,8,8-tetrachloro-2,6-di(para-nitrobenzyl)-1,5-dithia-2,6-diazacyclooctane-3,7-dione

EXAMPLE 19
A. 2,2-dichloro-2-(chlorothio) acetanilide
B. 4,4,8,8-tetrachloro-2,6-diphenyls 1,5-dithia-2,6-diazacyclooctane-3,7-dione

EXAMPLE 20
A. meta-(tribromomethyl)-2,2-dichloro-2-(chlorothio) acetanilide
B. 4,4,8,8-tetrachloro-2,6-di[meta-(tribromomethyl)phenyl]-1,5-dithia-2,6-diazacyclooctane-3,7-dione

EXAMPLE 21
A. 2,2-dichloro-para-(trichloromethyl)-2-(chlorothio) acetanilide
B. 4,4,8,8-tetrachloro-2,6-di[para-(trichloromethyl)phenyl]-1,5-dithia-2,6-diazacyclooctane-3,7-dione

EXAMPLE 22
A. 2,2-dichloro-2-(chlorothio)-3',4'-di(trifluoromethyl) acetanilide
B. 4,4,8,8-tetrachloro-2,6-di[3,4-di(trifluoromethyl)phenyl]1,5-dithia-2,6-diazacyclooctane-3,7-dione

EXAMPLE 23
A. 2,2-dichloro-2-(chlorothio)-N-(isopropoxyethyl) acetamide
B. 4,4,8,8-tetrachloro-2,6-diisopropoxyethyl-1,5-dithia-2,6-diazacyclooctane-3,7-dione

EXAMPLE 24
A. N-(butoxybutyl)-2,2-dichloro-2-(chlorothio) acetamide
B. 4,4,8,8-tetrachloro-2,6-dibutoxybutyl-1,5-dithia-2,6-diazacyolooctane-3,7-dione

EXAMPLE 25
A. 2,2-dichloro-2-(chlorothio)-N-(methoxymethyl) acetamide
B. 4,4,8,8-tetrachloro-2,6-dimethoxymethyl-1,5-dithia-2,6-diazacyclooctane-3,7-dione

EXAMPLE 26
A. 2,2-dichloro-2-(chlorothio-ortho-cyano acetanilide
B. 4,4,8,8-tetrachloro-2,6-di(ortho-cyanophenyl)-1,5-dithia-2,6diazacyclooctane-3,7-dione

EXAMPLE 27
A. 2,2-dichloro-2-(chlorothio)-3'-methoxy-p-toluidide
B. 4,4,8,8-tetrachloro-2,6-di(3-methoxy-p-tolyl)-1,5-dithia-2,6diazacyclooctane-3,7-dione

EXAMPLE 28
A. 2,2-dichloro-2-(chlorothio)-ortho-iodo acetanilide
B. 4,4,8,8-tetrachloro-2,6-di(ortho-iodophenyl)-2,6-diaza-1,5-dithia-2,6-diazacyclooctane-3,7-dione

EXAMPLE 29

A. 2,2,2',4',5'-pentachloro-2-(chlorothio) acetanilide
B. 4,4,8,8-tetrachloro-2,6-di(2,4,5-trichlorophenyl)-1,5-dithia-2,6-diazacyclooctane-3,7-dione

EXAMPLE 30

A. para-butoxy-2,2-dichloro-2-(chlorthio) acetanilide
B. 4,4,8,8-tetrachloro-2,6-di(para-butoxyphenyl)-1,5-dithia-2,6-diazacyclooctane-3,7-dione

EXAMPLE 31

A. 2,2-dichloro-2-(chlorothio)-2',5'-diethoxy acetanilide
B. 4,4,8,8-tetrachloro-2,6-di(2,5-diethoxyphenyl)-1,5-dithia-2,6-diazacyclooctane-3,7-dione

EXAMPLE 32

A. 2,2-dichloro-2-(chlorothio)-3',5'-diisopropyl acetanilide
B. 4,4,8,8-tetrachloro-2,6-di(3,5-diisopropylphenyl)-1,5-dithia-2,6-diazacyclooctane-3,7-dione

EXAMPLE 33

A. 2,2-dichloro-2-(chlorothio)-3',4',5'-triethyl acetanilide
B. 4,4,8,8-tetrachloro-2,6-di(3,4,5-triethylphenyl)-1,5-dithia-2,6-diazacyclooctane-3,7-dione

EXAMPLE 34

A. 2,2-dichloro-2-(chlorothio)-para-hexyl acetanilide
B. 4,4,8,8-tetrachloro-2,6-di(para-hexylphenyl)-1,5-dithia-2,6-diazacyclooctane-3,7-dione

EXAMPLE 35

A. 2,2-dichloro-2-(chlorothio)-meta-cyclopentyl acetanilide
B. 4,4,8,8-tetrachloro-2,6-di(meta-cyclopentylphenyl)-1,5-dithia-2,6-diazacyclooctane-3,7-dione

EXAMPLE 36

A. 2,2-dichloro-2-(chlorothio)-meta-nitro acetanilide
B. 4,4,8,8-tetrachloro-2,6-di(meta-nitrophenyl)-1,5-dithia-2,6-diazacyclooctane-3,7-dione

EXAMPLE 37

Contact herbicidal activity of representative compounds of this invention is determined by the following procedure:

The compound to be tested is applied in spray form to plants of a given age of several grasses and broadleaf species. After the plants are the desired age, each aluminum pan of plants is sprayed with a given volume of a 0.2 percent concentration solution of the candidate chemical, corresponding to a rate of approximately 3.6 lbs. per acre. This solution is prepared from an aliquot of a 2 percent solution of the candidate compound in acetone, a known amount of cyclohexanone-emulsifying agent mix, and sufficient water to make up to volume. The emulsifying agent is a mixture comprising 35 wt. percent butylamine dodecylbenzene sulfonate and 65 wt. percent of a tall oil-ethylene oxide condensate having about 6 moles of ethylene oxide per mole of tall oil. The injuries to the plants are then observed approximately 14 days later and the results are recorded.

Contact herbicidal activity of the compound prepared in Example 3 is observed against lambsquarter and cocklebur. Contact herbicidal activity of the compounds prepared in Example 4 is observed against barnyard grass. Contact herbicidal activity of the compound prepared in Example 5 is observed against lambsquarter.

EXAMPLE 38

Pre-emergent herbicidal activity of representative compounds of this invention is determined by the following procedure:

A good grade of top soil is placed in aluminum pans and compacted to a depth of three-eighths to one-half inch from the top of the pan. A pre-determined number of seeds of each of several plant species are placed on top of the soil in the pans. The seeds are covered with soil and the pans leveled. The herbicidal composition is applied by spraying the surface of the top layer of soil with a solution containing a sufficient amount of active ingredient to obtain a rate of application of 5 lbs. per acre. The pans are then placed on a sand bench in the greenhouse and watered from below as needed. The plants are observed at the end of approximately 14 days and the results recorded.

Pre-emergent activity of the compound prepared in Example 2 is observed against barnyard grass. Pre-emergent activity of the compound prepared in Example 3 is observed against cocklebur. Pre-emergent activity of the compound prepared in Example 5 is observed against downy brome.

While the illustrative embodiments of the invention have been described hereinbefore with particularity, it will be understood that various other modifications will be apparent to and can readily be made by those skilled in the art without departing from the scope and spirit of the invention. Accordingly, it is not intended that the scope of the claims appended hereto be limited to the examples and description set forth herein but rather the claims be construed as encompassing all the features of patentable novelty which reside in the present invention including all features which would be treated as equivalents thereof by those skilled in the art to which the invention pertains.

What is claimed is:

1. A 4,4,8,8-tetrachloro-2,6-diorgano-1,5-dithia-2,6-diazacyclooctane-3,7-dione of the formula

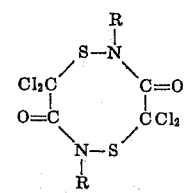

wherein R is alkyl of from one to six carbons, alkoxyalkyl of from two to eight carbons, benzyl, phenyl, substituted phenyl wherein the ring substituents thereof total from 1 to 3 same or different substituents selected from the group of substituents consisting of alkyl of from one to six carbons, lower alkoxy, halo, nitro, cyano and trihalomethyl, provided that the number of nitro substituents be from 0 to 2, and provided that the number of said substituents in the 2 and 6 positions on the ring be from 0 to 1, substituted benzyl wherein the substituents are in any position on the phenyl ring but otherwise as defined for substituted phenyl.

2. The compound of claim 1 wherein R is phenyl.
3. A compound of claim 1 wherein R is substituted phenyl.
4. A compound of claim 3 wherein R is halophenyl.
5. A compound of claim 4 wherein the halo is chlorine.
6. The compound of claim 5 wherein R is parachlorophenyl.
7. A compound of claim 4 wherein the halo is bromine.
8. The compound of claim 7 wherein R is metabromophenyl.
9. The compound of claim 7 wherein R is parabromophenyl.
10. A compound of claim 3 wherein R is trihalomethyl-phenyl.
11. The compound of claim 10 wherein R is meta-(trifluoromethyl)phenyl.
12. A compound of claim 3 wherein the ring substituents are alkyl of from one to six carbons.
13. The compound of claim 12 wherein R is para-tolyl.
14. A compound of claim 1 wherein R is substituted benzyl.
15. A compound of claim 1 wherein R is alkyl or from one to six carbons.
16. A compound of claim 1 wherein R is alkoxyalkyl of from two to eight carbons.
17. A method for the preparation of a 4,4,8,8-tetrachloro-2,6-diorgano-1,5-dithia-2,6-diazacyclooctane-3,7-dione of the formula

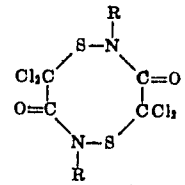

wherein R is alkyl of from one to six carbons, alkoxyalkyl of from two to eight carbons, benzyl, phenyl, substituted phenyl wherein the ring substituents thereof total from 1 to 3 same or different substituents selected from the group of substituents consisting of alkyl of from one to six carbons, lower alkoxy, halo, nitro, cyano and trihalomethyl, provided that the number of nitro substituents be from 0 to 2, and provided that the number of said substituents in the 2 and 6 positions on the ring be from 0 to 1, substituted benzyl wherein the substituents are in any position on the phenyl ring but otherwise as defined for substituted phenyl which comprises eliminating hydrogen chloride from a dichloromethane sulfenyl chloride of the formula

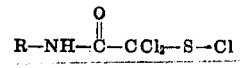

wherein R has the aforementioned significance, in the presence of an HCl scavenger.

* * * * *